Oct. 20, 1936.                    D. SAMIRAN                    2,057,693
                          FLUID SEGREGATING APPARATUS
                              Filed May 9, 1932
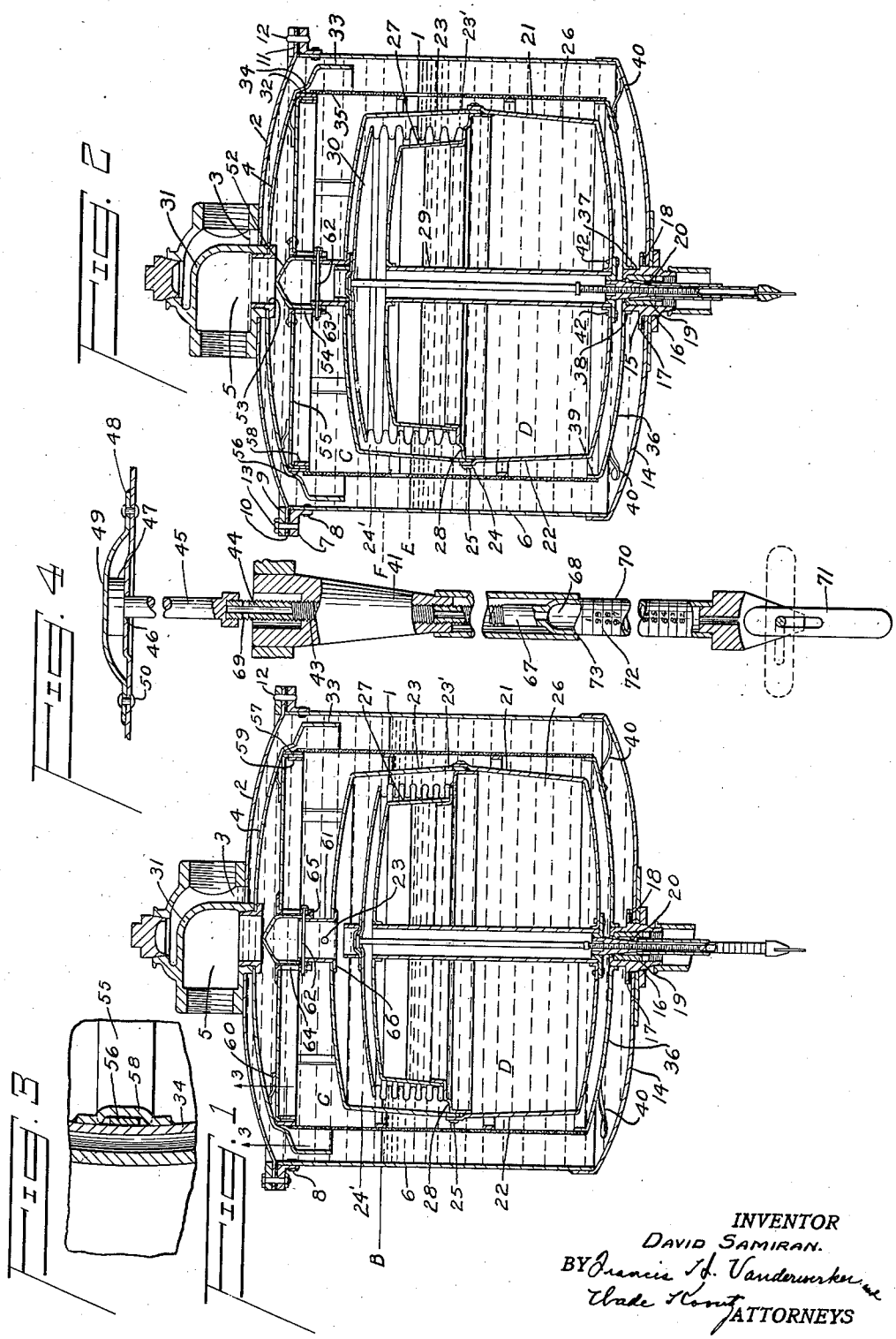
INVENTOR
DAVID SAMIRAN.
BY Francis H. Vanderwerker
   Clade Kont
              ATTORNEYS Patented Oct. 20, 1936

2,057,693

UNITED STATES PATENT OFFICE 2,057,693

FLUID SEGREGATING APPARATUS

David Samiran, Dayton, Ohio

Application May 9, 1932, Serial No. 610,297

18 Claims. (Cl. 210—54)

(Granted under the act of March 3, 1883, as amended April 30, 1928; 370 O. G. 757)

The invention described herein may be manufactured and used by or for the Government for governmental purposes, without the payment to me of any royalty thereon.

The present invention relates generally to apparatus for the automatic isolation of fluids and more particularly to apparatus having float means responsive to fluids having densities greater or less than a fluid of given density and is particularly concerned in the adjusting of a float to a desired density.

Reference is made to my copending application Serial No. 448,391, filed April 29, 1930 and to my copending reissue application Serial No. 414,759, filed December 17, 1929, in which I have described a novel method and means for obtaining an adjustment of a float to a predetermined specific gravity or density by adjusting the same within a liquid of the same or a known specific gravity or density.

In accordance with the law of buoyancy, known as the Archimedean principle, any body immersed in a fluid at rest is buoyed up by a force equal to the weight of the fluid displaced by the body. Furthermore, in accordance with this principle the mass of liquid displaced by a body floating in it is equal to the mass of the floating body. But the mass of liquid displaced equals the product of the density of the liquid and the volume of the immersed portion of the floating body, consequently if the volume of the immersed portion of a body be increased or decreased the mass of liquid displaced by the body when so varied will also be increased or decreased and the buoyancy of the body will vary in the same manner.

The primary object of the present invention is to provide in connection with apparatus such as described in my above-referred to copending applications an improved float device normally adjusted to have a known buoyancy in a given reference medium, that is a float of predetermined density, said float device being characterized by including new and novel means for varying the volume of the float to thereby adjust the float device to any desired density so that the resultant buoyant force of the float due to the change in the density of the overlying medium with which the reference medium is associated will cause a change in the immersion of the float inversely proportional to the difference in the densities of the reference and that of the overlying medium.

A further object of the present invention is to provide in a float device of this character a bellows arrangement including means for readily expanding or contracting said bellows so that changes in the displacement of the overlying medium may be readily effected.

A further object of the present invention is to provide in connection with a float device of the above-mentioned character manually operable means mounted exteriorly of said apparatus, which is so constructed and arranged that the expansion or contraction of said bellows may be readily effected without requiring removal of said float device from the apparatus.

A still further object of the present invention is to provide in connection with a float device of the above-mentioned character graduated means for visually indicating and for varying the volume of the float device to a predetermined setting in order to adjust said float to be buoyant in liquids the densities of which correspond with the setting of said float device.

With these and other objects in view, the invention consists in the construction and arrangement of parts, all of which will be first fully described and afterward specifically pointed out in the appended claims.

Referring to the accompanying drawing:

Fig. 1 is a vertical sectional view of the apparatus, showing the setting of the bellows when the float device is adjusted to the desired reference medium;

Fig. 2 is a vertical sectional view similar to Fig. 1 with the bellows shown in an adjusted position;

Fig. 3 is a part sectional view taken on the line 3—3 of Fig. 1; and

Fig. 4 is an enlarged detail view of the control means for expanding or collapsing the bellows.

Referring more particularly to the drawing, in which like numerals refer to similar parts throughout the several views thereof, the apparatus in the preferred embodiment of my invention herein illustrated, in connection with which the float means to be hereinafter described embodies the principle set forth in my copending application Serial No. 448,391, filed April 29, 1930, and comprises generally a casing 1, which includes the removable top plate 2, inlet passage 3, deflector 4 and the outlet passage 5.

The casing 1 is provided with a float chamber 6, which may be of any suitable material, but which is shown of metal in the accompanying drawing. This chamber is conventionally shaped and is provided with a flanged annular ring member 7, which is suitably secured to the upper end of the float chamber by means of rivets 8 or the like. The flanged portion of the ring member 7 is adapted to be received by a clamping ring 9, against a suitable packing gasket 10, interposed between the flange 11 of the top plate 2 and the flange portion of the ring member 7. The assembly is effected by the dowel pins 12 and screws 13, as shown in Figs. 1 and 2, to effect fluid-tight joint.

The bottom 14 of the float chamber is apertured to receive the upstanding valve guide 15, which, as shown in Figs. 1 and 2, is provided with a threaded nipple 16 which is threaded through the aperture in the bottom of the float chamber. The threaded end of the valve guide also includes a flange 17 under which is disposed a suitable packing gasket 18 to effect a fluid-tight joint. The said threaded end of the valve guide 15 is internally threaded to receive the centrally bored valve seal 19 and is also provided with a drain chamber 20 forming a discharge passage for fluids.

As shown in Figs. 1 and 2, float 21 is disposed within the float chamber 6 and is constructed generally of two cylindrical sections 22 and 23 having their open ends joined together by telescoping the flange 24 formed on the upper edge of the cylindrical section 22 within the lower edge of the cylindrical section 23. The telescope portions of the cylindrical sections 22 and 23 are secured in place by means of screws 25, as shown in Fig. 2. The float 21 is provided with a chamber 26 adapted for receiving a fluid for adjusting the float in substantially the identical manner disclosed in my above-referred-to copending application. As will be noted by referring to Fig. 1, the open end of the cylindrical section 22 is closed by means of a cylindrical cap 27 having an annular flange 28, the latter being brazed or otherwise secured to the upper end of the section 22. The closed ends of the cylindrical section 22 and cap 27 are apertured, as shown in Fig. 1, to receive an upstanding centrally disposed tubular member 29 forming an air conduit, said tubular member being suitably brazed or otherwise secured to the cylindrical section 22 and cap 27 to render the chamber fluid-tight.

Concentrically disposed upon the cap 27 and in inverted position, is a cup-shaped bellows 30 of relatively thin cross-sections, the open end of said bellows being brazed or otherwise secured to the cap 27 to render the bellows fluid-tight. As will be noted by referring to Figs. 1 and 2, the upper cylindrical section 23 is provided with a plurality of openings 23' for the admission of fluid in the chamber 24' formed by the walls of the bellows 30 and the cap 27.

The deflector 4, heretofore mentioned, is positioned above and supported in spaced relation to the float and float chamber and is secured to the outlet fitting 31 in such a manner as to deflect the incoming fluids toward the walls of the float chamber. This deflector 4 is constructed to provide an inner annular flange 32 and an outer annular flange 33. The inner annular flange 32 forms a guide for a collar 34 that is secured to a sieve 35, while the outer flange is substantially below the inner flange and forms a passage with the wall of the float chamber whereby the deflected incoming fluids are directed toward the sides of the float chamber and away from the sieve 35. A lower deflector 36 is arranged in spaced relation to the float and float chamber and is supported by means of an annular shoulder 37 formed on the upper end of the valve guide 15 adapted for receiving the annular flange 38 that is centrally disposed and formed on the bottom of the deflector 36. The sieve 35 is fixedly secured at its one end to an upwardly presenting flange 39 formed on the lower deflector 36 and at its other end to the collar 34 which, as stated before, is slidably received within the flanged guide of the deflector. In order to insure a close contact between the upper edge of the collar 34 and the deflector 4, the lower deflector is arranged to be yieldingly urged upwardly. This is accomplished by interposing a plurality of flat springs 40 between the lower deflector and bottom of the float chamber and securing the same, as will be noted by referring to Figs. 1 and 2, to the bottom of the lower deflector 36. It will thus be seen that the sieve and lower deflector 36 can be removed as a unit after the top plate 2 of the float chamber, to which the upper deflector 4 and outlet fitting are attached, has been unbolted from the float chamber.

As will be noted by reference to Figs. 1 and 2 of the drawing, there is provided at the bottom of the float 21 coaxially arranged with respect to the needle valve 41 the tubular member 29, which same is formed with a flanged portion suitably secured to the lower cylindrical section 22 by means of machine screws 42 which also serve the purpose of sealing the float after the liquid has been introduced therein in the process of adjusting the float. The needle valve 41 is provided with internal threads 43 adapted for adjustably receiving a central rod 44 threaded at its lower end for engagement in the threaded portion of the needle valve. The upper end of said control rod has secured thereto an extension 45 adapted to bear in an opening 46 provided in the top portion of the bellows heretofore mentioned. The extension 45 is provided with a flanged end 47 which is interposed between the top of the bellows and a cover plate 48 having a relieved portion 49 which bears against the upper surface of the flanged end 47. The cover plate is suitably secured to the bellows by means of rivets 50 or the like, the edges of which may be brazed, as shown at 51, to the bellows to render the same liquid-tight.

The upper needle valve assembly for controlling the outlet 5 of the float chamber comprises an upper needle valve 52 cooperating with a valve seat member 53 provided in the lower end of the outlet fitting 31. This needle valve is guided in a guide member 54 having an outstanding flange which is riveted or otherwise secured to a cross strap 55. The said cross strap is provided with down turned ends 56 and 57, which are interposed between the sides of the collar 34 and retaining brackets 58 and 59 secured to the collar 34, as shown in Fig. 3. In order to maintain the ends of the cross strap 55 in close contact with the collar 34 and brackets 58 and 59, the cross strap is arranged to be yieldingly urged downwardly. This is accomplished by interposing a plurality of flat springs 60 between the upper deflector 4 and the cross strap. It will thus be seen that the valve guide and cross strap can be readily removed as a unit after the top plate 2, to which the upper deflector 4 is attached, has been unbolted from the float chamber.

The upper needle valve 52, heretofore mentioned, is secured at its lower end to a tubular support 61 by means of the pin 62, the other ends of said pin being provided with rollers 63 adapted for bearing contact in oppositely disposed slotted guideways 64 and 65 provided in the guide member 54. The support 61 is adapted to be received in a centrally disposed aperture formed in the closed end of the upper cylindrical section 23 of the float and is formed with an outstanding flange 66, which may be brazed or otherwise secured to the said cylindrical section. By means of this construction it will be readily understood that when in assembled relation in the float chamber, the float while being free to move up and down in the chamber, is prevented from rotating in the float chamber by reason of the rollers 63 that are guided in the guideways 64 and 65.

Referring more particularly to the Figs. 1 and 2, it will be noted that the lower end of the control rod 44 extends exteriorly of the float chamber 6, the lower end 67 of which is provided with a passageway 68 communicating at its lower end with the atmosphere and at its upper end with the conduit 29 by means of laterally disposed openings 69. The lower end of the control rod, as will be noted by referring to Fig. 4, is formed with a tubular extension 70, the lower end of which is provided with a pivotally-mounted, hand-grasping portion 71 by means of which the control rod may be readily adjusted. Graduations 72 are provided on the outer surface of the extension 70 adapted to cooperate with the lower edge 73 forming a reference of a telescoping tube 74 mounted on the lower end of the needle valve 41. These graduations may be calibrated for liquids having specific gravities covering the entire range of liquids having specific gravities that fall within the range of adjustment of the bellows. The float is adjusted to a predetermined density in substantially the identical manner referred to in my copending application referred to hereinabove and, as will be noted by referring to Figs. 1 and 2, the closed end of the lower cylindrical section 23 is spherical in shape, the base radius of which is the radius of the cylindrical section and whose radius of curvature may be either computed or found by experiment. In adjusting the float it is only necessary to remove the screws 42 and by immersing the float in an inverted position in the reference medium for which the float is intended to be adjusted, sufficient fluid can be introduced in the float to adjust it in the manner set forth in my above-referred-to copending application. In adjusting the float to the desired reference medium it is necessary that the bellows be first sufficiently collapsed to prevent displacement of liquid by expansion of the bellows.

Having thus described the component parts of the invention, its operation is as follows:

Fluid supplied to the apparatus through a pipe or feed line tank or other supply (not shown) passes through the inlet passage 3 and then into the deflector 4, where it is deflected toward the sides of the float chamber downwardly and then through the sieve 35. In order to adapt the device to the isolation and separation of the particular non-miscuous fluids of different specific gravity to be handled, such as the isolation or separation of water from gasoline, water being the desired reference medium in which the float is adjusted, the buoyancy of the float is adjusted in the manner set forth above, so that by this means the float can be exactly and accurately adjusted to the end that the buoyancy level "B" of the liquid of heavier specific gravity is maintained at a constant height, as shown in Fig. 2.

In Fig. 2 the buoyancy level of the liquid is indicated by B, while C indicates the lighter component of the liquid, such as gasoline, and D indicates the heavier component, such as water, which is separated and isolated by the device. When a sufficient quantity of the heavier component enters the float chamber, it causes a rise in the buoyancy level B as from the dotted line position E in Fig. 2 to the dotted line position F in said figure. By reason of the relative buoyancy, the float is displaced upwardly, which raises the needle valve 41 and permits escape of the heavier component through the drain 20. This discharge continues until the buoyancy level B is restored at which level the float has descended into position to reseat the needle valve 41 and shut off further evacuation of the heavier component.

Should it be desired to effect a segregation of fluids having specific gravities greater or less than the specific gravity of the fluid in which said float is normally adjusted, the same is accomplished by manually collapsing or expanding the bellows respectively. In so doing the volume of the float will be decreased or increased to cause the same to effect a change in the displacement of the lighter component, which change will be proportional to the difference in change in volume of the float device. By means of this construction it is possible to adjust the float device to any desired density within a given range so that a segregation of fluids having densities within the given range may be segregated by a simple manual adjustment and without removing the float from the apparatus.

Having thus fully described the invention, it may be obvious to those skilled in the art that the construction shown and described is subjected to changes, alterations and modifications. I am fully aware of this and it is to be understood that the specific construction shown in the accompanying drawing is merely illustrative of any preferred construction, and that I consider myself clearly entitled to all such changes and modifications as fall within the limit and scope of the appended claims.

I claim:

1. An apparatus of the class described, comprising a casing having a float chamber adapted to receive fluids having different specific gravities, a float in said chamber, said float being normally adjusted to float in a liquid of heavier specific gravity and sink in a liquid of lighter specific gravity, a valve associated with said float, said float chamber being provided with a discharge passage controlled by said valve and collapsible expansible means cooperating with said float and adapted for varying the volume of said float to change the buoyancy thereof, the whole arranged for the segregation and isolation of fluids of different specific gravities.

2. An apparatus of the class described, comprising a casing having a float chamber adapted for receiving fluids having different specific gravities, a collapsible float in said chamber, said float being normally adjusted to float in a liquid of heavier specific gravity and sink in a liquid of lighter specific gravity, a valve associated with said float, said float chamber being provided with a discharge passage controlled by said valve and adjustable means extending exteriorly of said apparatus and associated with said float for varying the volume of said float and thereby changing the buoyancy thereof, the whole arranged for the segregation and isolation of fluids of different specific gravities.

3. An apparatus of the class described, comprising a casing having a float chamber adapted for receiving fluids having different specific gravities, a collapsible float in said chamber, said float being normally adjusted to float in the liquid of heavier specific gravity and sink in the liquid of lighter specific gravity, a valve associated with said float, said float chamber being provided with a discharge passage controlled by said valve and adjustable means extending exteriorly of said apparatus for obtaining a float of predetermined density greater or less than the normal density by varying the volume of said float in accordance with a predetermined setting and effect a segregation of fluids having specific gravities greater or less than the specific gravity of the fluid in which said float is normally adjusted.

4. An apparatus of the class described, comprising a casing having a float chamber adapted for receiving fluids having different specific gravities, a collapsible float in said chamber, said float being normally adjusted to float in the liquid of heavier specific gravity and sink in the liquid of lighter specific gravity, a valve associated with said float, said float chamber being provided with a discharge passage controlled by said valve, means including a readily expansible, collapsible bellows associated with said float and adapted for displacing the fluid of lighter specific gravity in said float chamber and manual means associated with said valve for readily expanding or collapsing said bellows to vary the volume thereof, thereby effecting a change in the buoyancy of said float, the whole arranged for the segregation and isolation of fluids of different specific gravities within said float chamber.

5. An apparatus of the class described, comprising a casing having a float chamber adapted for receiving fluids having different specific gravities, a float in said chamber, said float being normally adjusted to float in the liquid of heavier specific gravity and sink in the liquid of lighter specific gravity, a valve carried by said float, said float chamber being provided with a discharge passage controlled by said valve, a bellows mounted on said float and means flexibly connected to said bellows for readily expanding and collapsing said bellows and varying the volume thereof to effect a change in buoyancy of said float.

6. An apparatus of the class described, comprising a casing having a float chamber adapted for receiving fluids having different specific gravities, a float in said chamber, said float being normally adjusted to float in the liquid of heavier specific gravity and sink in the liquid of lighter specific gravity, a valve carried by said float, said float chamber being provided with a discharge passage controlled by said valve, a bellows mounted on said float and means operable exteriorly of said apparatus flexibly connected to said bellows for readily expanding or collapsing said bellows to vary the volume thereof and effect a change in the buoyancy of said float.

7. An apparatus of the class described, comprising a casing having a float chamber adapted for receiving fluids having different specific gravities, a collapsible float in said chamber, said float being normally adjusted to float in the liquid of heavier specific gravity and sink in the liquid of lighter specific gravity, a valve associated with said float, said float chamber being provided with a discharge passage controlled by said valve, means including a bellows provided with a chamber carried by said float adapted for displacing the fluid of lighter specific gravity in said float chamber and means for readily expanding or collapsing said bellows to vary the volume thereof and effect a change in the buoyancy of said float, said means being provided with an opening adapted for readily admitting air into or discharging air from said bellows when said bellows is expanded or collapsed.

8. An apparatus of the class described, comprising a casing having a float chamber adapted for receiving fluids having different specific gravities, a float in said chamber having an expansible, collapsible bellows mounted thereon, said float being normally adjusted to float in the liquid of heavier specific gravity and sink in the liquid of lighter specific gravity, a valve associated with said float, said float chamber being provided with a discharge passage controlled by said valve and means for readily expanding or contracting said bellows to vary the volume of said float and effect a change in the buoyancy of said float, said means comprising a manually adjustable control rod connected to said bellows at its one end, the other end of said rod extending exteriorly of said apparatus.

9. An apparatus of the class described, comprising a casing having a float chamber adapted for receiving fluids having different specific gravities, a float in said chamber having an expansible, collapsible bellows mounted thereon, said float being normally adjusted to float in the liquid of heavier specific gravity and sink in the liquid of lighter specific gravity, a valve associated with said float, said float chamber being provided with a discharge passage controlled by said valve, means including a cup-shaped bellows carried by said float adapted for displacing fluid in said float chamber and means for readily expanding or collapsing said bellows to vary the volume thereof and effect a change in the buoyancy of said float, said means comprising a manually adjustable control rod connected at its inner end to said bellows, the outer end of said control rod extending exteriorly of said float chamber.

10. An apparatus of the class described, comprising a casing having a float chamber adapted for receiving fluids having different specific gravities, a float in said chamber having an expansible, collapsible bellows mounted thereon, said float being normally adjusted to float in the liquid of heavier specific gravity and sink in the liquid of lighter specific gravity, a valve associated with said float, said float chamber being provided with a discharge passage controlled by said valve, means including an inverted cup-shaped bellows superposed on said float and means for readily expanding or contracting said bellows to vary the volume thereof and effect a change in buoyancy of said float, said means comprising a manually adjustable control rod connected at its inner end to the top portion of said bellows, the outer end of said control rod extending exteriorly of said float chamber.

11. An apparatus of the class described, comprising a casing having a float chamber adapted for receiving fluids having different specific gravities, a float in said chamber, said float being normally adjusted to float in the liquid of heavier specific gravity and sink in the liquid of lighter specific gravity, a valve carried by said float, said float chamber being provided with a discharge passage controlled by said valve, means including an inverted cup-shaped bellows disposed upon the upper end of said float adapted for displacing fluid in said float chamber and adjustable means for readily expanding and contracting bellows to vary the volume thereof and effect a change in the buoyancy of said float, said means comprising a manually operable control rod adjustably mounted in said valve, the inner end of said control rod being flexibly connected to the top portion of said bellows, the outer end of said control rod extending exteriorly of said casing.

12. An apparatus of the class described, comprising a casing having a float chamber adapted for receiving fluids having different specific gravities, a float in said chamber, said float being normally adjusted to float in the liquid of heavier specific gravity and sink in the liquid of lighter specific gravity, a valve carried by said float, said float chamber being provided with a discharge passage controlled by said valve, means including a cup-shaped bellows disposed upon the upper end of said float adapted for displacing fluid in said float chamber, means for readily expanding or contracting said bellows to vary the volume thereof and effect a change in the buoyancy of said float, said means being provided with graduations adapted for predeterminately setting the float to any desired buoyancy.

13. An apparatus of the class described, comprising a casing having a float chamber adapted for receiving fluids having different specific gravities, a float in said chamber, said float being normally adjusted to float in the liquid of heavier specific gravity and sink in the liquid of lighter specific gravity, a valve carried by said float, said float chamber being provided with a discharge passage controlled by said valve, means including a cup-shaped bellows disposed upon the upper end of said float adapted for displacing fluid in said float chamber and adjustable means for readily expanding and contracting said bellows to vary the volume thereof and effect a change in the buoyancy of said float, said means comprising a manually operable control rod adjustably mounted in said valve, the inner end of said control rod being flexibly connected to the top of said bellows, the outer end of said control rod extending exteriorly of said casing and being provided with graduations adapted for predeterminately setting the float to any desired buoyancy.

14. An apparatus of the class described, comprising a casing having a float chamber adapted for receiving fluids having different specific gravities, a float in said chamber, said float being normally adjusted to float in the liquid of heavier specific gravity and sink in the liquid of lighter specific gravity, a valve carried by said float, said float chamber being provided with a discharge passage controlled by said valve, means including an inverted cup-shaped bellows disposed upon the upper end of said float adapted for displacing fluid in said float chamber and adjustable means for readily expanding and contracting said bellows to vary the volume thereof and effect a change in the buoyancy of said float, means comprising a manually operable control rod adjustably mounted in said valve, the inner end of said control rod being flexibly connected to said bellows, the outer end of said control rod extending exteriorly of said casing and being provided with graduations calibrated for fluids having specific gravities greater or less than the specific gravity of the reference fluid in which said float is normally adjusted.

15. In a float adjusted to have a desired buoyancy in any given reference medium and sink in any overlying medium having a specific gravity less than the specific gravity of the reference medium, collapsible expansible means carried by said float for varying the volume of said float to change the buoyancy thereof.

16. In a float adjusted to have a desired buoyancy in any given reference medium and sink in any overlying medium of a specific gravity less than the specific gravity of the reference medium, an expansible collapsible bellows mounted on said float and means cooperating with said bellows for varying the volume thereof in accordance with a predetermined setting and thereby obtain a predetermined change in the buoyancy of said float.

17. A float adapted to be adjusted to have a desired buoyancy in any given reference medium and sink in any overlying medium having a specific gravity less than the specific gravity of the reference medium, an expansible collapsible bellows carried by said float and arranged thereon in such a manner as to be immersed in the overlying medium and means cooperating with said bellows for varying the volume thereof in accordance with a predetermined setting to effect a change in displacement of the overlying medium and effect a resultant change in the buoyancy of said float.

18. A float adapted to be adjusted to have a desired buoyancy in any given reference medium and sink in any overlying medium having a specific gravity less than the specific gravity of the reference medium, an expansible collapsible bellows carried by said float and arranged thereon in such a manner as to be immersed in the overlying medium and means cooperating with said bellows for varying the volume thereof to effect a change in displacement of the overlying medium and effect a resultant change in the buoyancy of said float, said means including a manually adjustable control rod extending exteriorly of said float, the inner end of said control rod having a flexible connection with said bellows.

DAVID SAMIRAN.